(12) United States Patent
Jayam et al.

(10) Patent No.: US 10,069,782 B2
(45) Date of Patent: Sep. 4, 2018

(54) METHOD AND SYSTEM TO FACILITATE ELECTRONIC COMMUNICATION BETWEEN INTERNAL TEAMS AND EXTERNAL CONTACTS

(71) Applicant: Xenovus Inc., Santa Clara, CA (US)

(72) Inventors: Ramkumar Jayam, Saratoga, CA (US); Anil Kapatkar, Los Altos, CA (US); Srini Gargeya, Saratoga, CA (US); Arjun Mukherjee, Hyderabad (IN); T. V. P. Kameswar Rao, Hyderabad (IN); Vijay Kumar Sabbu, Hyderabad (IN); Rajeev Kumar Kallempudi, Hyderabad (IN); Krishna Teja Tatavarthy, Hyderabad (IN); Sandeep Sharma, Hyderabad (IN); Anoop Kumar Amanchi, Hyderabad (IN)

(73) Assignee: Xenovus Inc., Santa Clara, CA (US)

( * ) Notice: Subject to any disclaimer, the term of this patent is extended or adjusted under 35 U.S.C. 154(b) by 207 days.

(21) Appl. No.: 15/236,179

(22) Filed: Aug. 12, 2016

(65) Prior Publication Data
US 2018/0048607 A1    Feb. 15, 2018

(51) Int. Cl.
*G06F 15/16* (2006.01)
*H04L 12/58* (2006.01)
*G06Q 50/30* (2012.01)

(52) U.S. Cl.
CPC .............. *H04L 51/22* (2013.01); *G06Q 50/30* (2013.01)

(58) Field of Classification Search
CPC .................................. H04L 51/22; G06Q 50/30
See application file for complete search history.

(56) References Cited

U.S. PATENT DOCUMENTS

| | | | |
|---|---|---|---|
| 6,988,127 B2 | 1/2006 | Matsuda et al. | |
| 7,340,442 B2 | 3/2008 | Jeanblanc et al. | |
| 7,797,256 B2 | 9/2010 | Zuckerberg et al. | |
| 8,224,917 B1 * | 7/2012 | Denise ................. | G06Q 10/107 709/206 |
| 8,661,087 B2 * | 2/2014 | Denise ................. | G06Q 10/107 709/206 |
| 8,745,140 B2 | 6/2014 | Hardy et al. | |
| 8,909,719 B2 | 12/2014 | Sacks et al. | |
| 8,984,051 B2 | 3/2015 | Olsen et al. | |
| 8,990,409 B2 | 3/2015 | De Kezel et al. | |
| 9,064,287 B2 | 6/2015 | Mencke | |

(Continued)

*Primary Examiner* — Moustafa M Meky
(74) *Attorney, Agent, or Firm* — Jacobsen IP Law

(57) ABSTRACT

A method is disclosed for facilitating electronic communication between an external contact and an internal point person and between the internal point person and one or more internal team members. An internal collaboration network is created based on a first e-mail received from or sent to the external contact. The membership of the internal collaboration network is based on recipient information from the first e-mail and includes the internal point person but excludes the external contact. A message from the internal point person is automatically sent to the members of the internal collaboration network for display in a private collaboration view of an app on a computing device. Later-sent e-mails from the external contact that have subjects matching the subject of the first e-mail are automatically sent to the membership for display in a customer view of the app.

20 Claims, 10 Drawing Sheets

(56) References Cited

U.S. PATENT DOCUMENTS

| | | | |
|---|---|---|---|
| 9,152,950 B2 * | 10/2015 | Weir | G06Q 10/107 |
| 9,256,341 B2 | 2/2016 | Megiddo et al. | |
| 9,286,364 B2 | 3/2016 | Kuruganti et al. | |
| 9,363,325 B2 | 6/2016 | Sacks et al. | |
| 2001/0047276 A1 | 11/2001 | Eisenhart | |
| 2005/0021750 A1 | 1/2005 | Abrams | |
| 2005/0198125 A1 | 9/2005 | Macleod Beck et al. | |
| 2007/0055731 A1 | 3/2007 | Thibeault | |
| 2007/0150603 A1 | 6/2007 | Crull et al. | |
| 2008/0065405 A1 | 3/2008 | Adelman et al. | |
| 2010/0131666 A1 | 5/2010 | Feinberg et al. | |
| 2010/0174799 A1 * | 7/2010 | Hewitt | G06F 17/24 709/206 |
| 2011/0022662 A1 | 1/2011 | Barber-Mingo et al. | |
| 2011/0093539 A1 | 4/2011 | Laurin et al. | |
| 2011/0307569 A1 | 12/2011 | Sacks et al. | |
| 2012/0215865 A1 | 8/2012 | Sacks et al. | |
| 2013/0191759 A1 * | 7/2013 | Bhogal | G06Q 10/10 715/752 |
| 2013/0254397 A1 | 9/2013 | Lai et al. | |
| 2014/0101137 A1 | 4/2014 | Satyanarayanan | |
| 2014/0173009 A1 * | 6/2014 | Denise | G06Q 10/107 709/206 |
| 2015/0026604 A1 | 1/2015 | Mulukuri et al. | |
| 2015/0127756 A1 | 5/2015 | Sacks et al. | |
| 2016/0104094 A1 * | 4/2016 | Yom-Tov | G06O 10/06395 705/7.41 |
| 2016/0149848 A1 | 5/2016 | Vembu et al. | |
| 2017/0193448 A1 * | 7/2017 | Piyush | G06Q 10/103 |

* cited by examiner

US 10,069,782 B2

METHOD AND SYSTEM TO FACILITATE ELECTRONIC COMMUNICATION BETWEEN INTERNAL TEAMS AND EXTERNAL CONTACTS

BACKGROUND

External-facing staff need a way to collaborate with their organization's internal teams to support their engagements with external entities such as customers, suppliers and partners. E-mail messages can be forwarded, and recipients may receive a message by virtue of their e-mail address being in the "to," "cc," or "bcc" field.

Internal collaboration tools (e.g., Slack) exist to conduct private internal discussions within an organization. One drawback of these tools is that they do not allow private internal discussions to be conducted in association with an external email conversation that is made visible to all the parties in the private internal discussion. For example, an external contact (e.g., a customer) may ask a question of an internal point person (e.g., a supplier's customer relationship manager for that customer). The internal point person then communicates with internal team members to collect the information needed to answer the external contact's question. Once the internal point person has the answer or the requested information, he or she then sends an e-mail to the external contact to answer the question. Thus, the internal point person is required to perform an information brokering role, which reduces the efficiency, speed, and effectiveness of communication of responses to the external contact.

Thus, there is an ongoing need for solutions that improve communications between external contacts and internal point people and between internal point people and internal team members.

BRIEF DESCRIPTION OF THE DRAWINGS

Objects, features, and advantages of the disclosure will be readily apparent from the following description of certain embodiments taken in conjunction with the accompanying drawings in which.

DETAILED DESCRIPTION

Figure 1A:
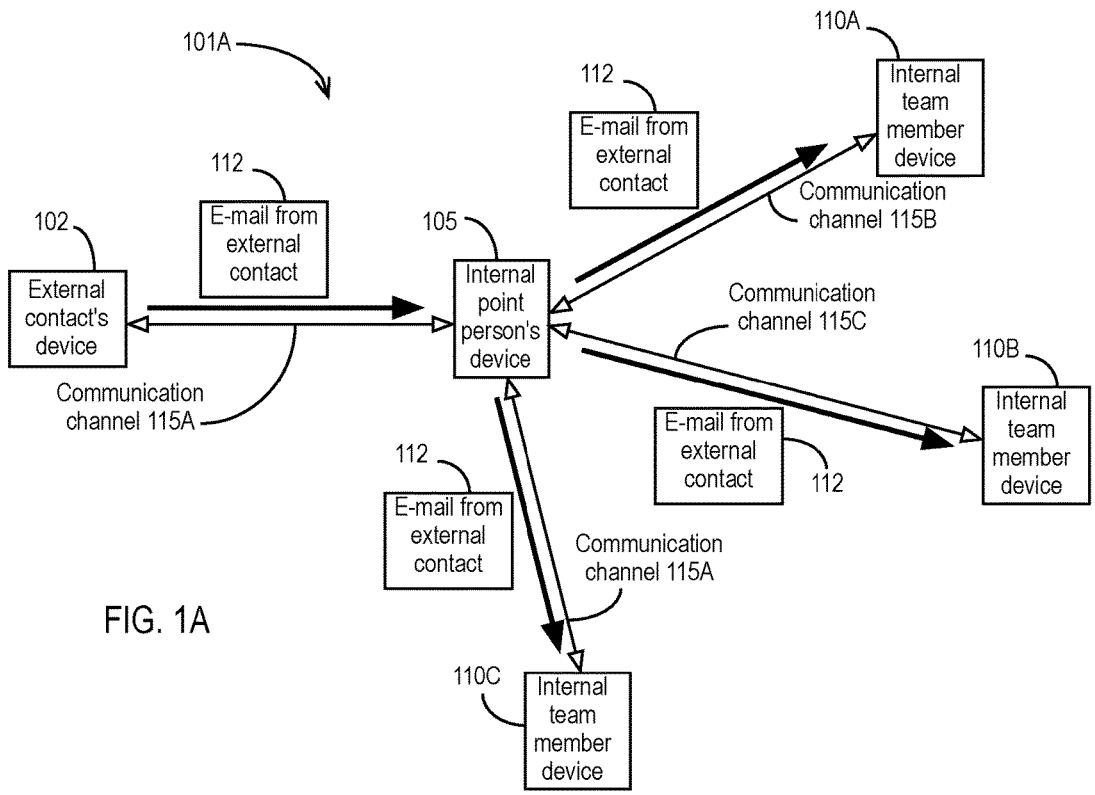
FIGS. 1A through 1D are diagrams illustrating the inefficiencies of communications using prior art systems.

FIGS. 1A through 1D illustrate the potential inefficiencies of communications between an external contact, an internal point person, internal team members, and, if present, an external collaborator. As shown in the example of FIG. 1A, an external contact sends an e-mail 112 requesting or sending information (e.g., asking a question, sending an error report, etc.) from his computing device 102 over the communication channel 115A. The e-mail 112 is received by an e-mail server (not shown) that handles e-mail sent to the internal point person, which sends the e-mail 112 to the internal point person's computing device 105. The internal point person then reads the e-mail 112 on his or her computing device 105 and identifies the internal team members 110 whose inputs are needed to provide a response to the external contact. In the example of FIG. 1A, the internal point person identifies three internal team members whose inputs are needed. Thereafter, the internal point person forwards the e-mail 112 from his or her computing device 105, and the e-mail server sends the e-mail 112 over the communication channels 115A, 115B, and 115C to the computing devices 110A, 110B, and 110C, respectively. Alternatively, the internal point person may initiate communication with the internal team members using a collaboration tool (e.g., Slack), in which case the internal point person must copy content from the external contact's e-mail into the collaboration tool to initiate the discussion with the internal team members.

The communication channels 115 between the various computing devices 102, 105, 110 and any associated e-mail servers may be wired (e.g., Ethernet) or wireless (e.g., Wi-Fi, cellular, etc.), or any combination of wired or wireless networks that enables the illustrated communications. Generally, the set of communication channels 115 over which the various devices shown in FIG. 1A communicate are part of a communication network, which may be wired or wireless or a combination of wired and wireless. For example, the external contact's computing device 102, the internal point person's computing device 105, and the internal team members' computing devices 110 may communicate with each other over a communication network that includes wired networks, wireless networks, or a combination of wired and wireless networks, including one or more of cellular, Wi-Fi, Ethernet, DSL, coaxial cable, etc. Furthermore, the communication network may include both private and public networks.

Figure 1B:
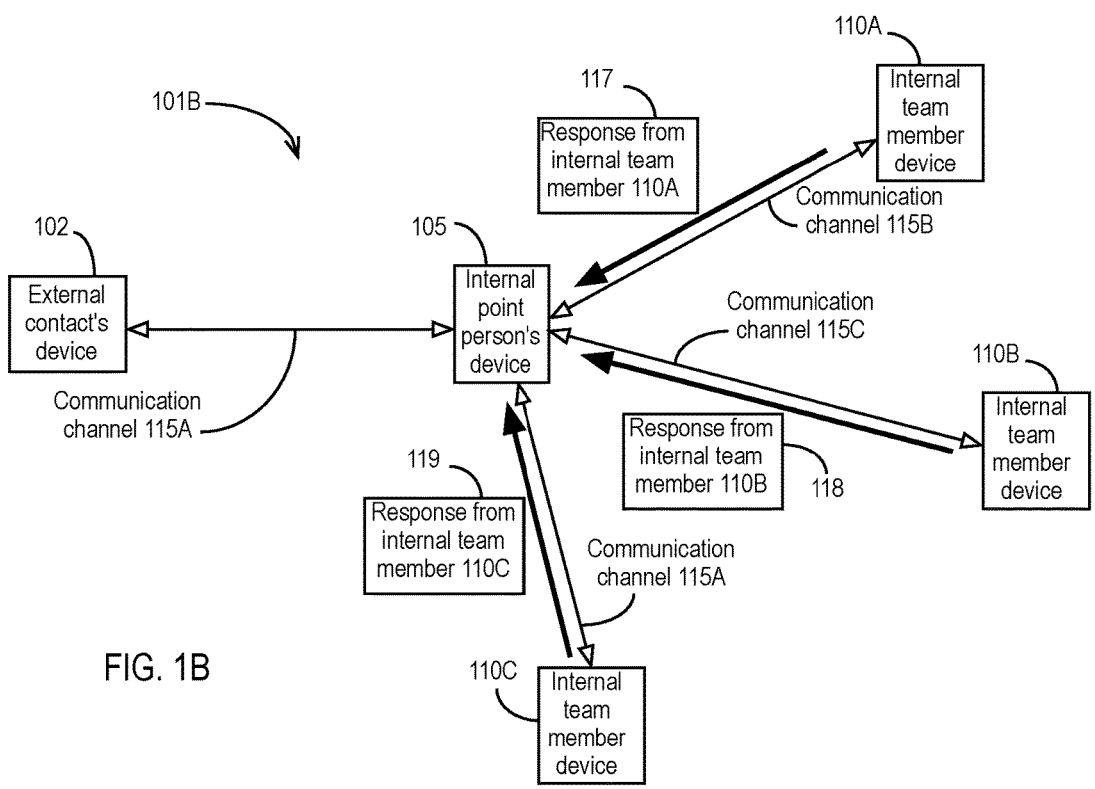
Figure 1C:
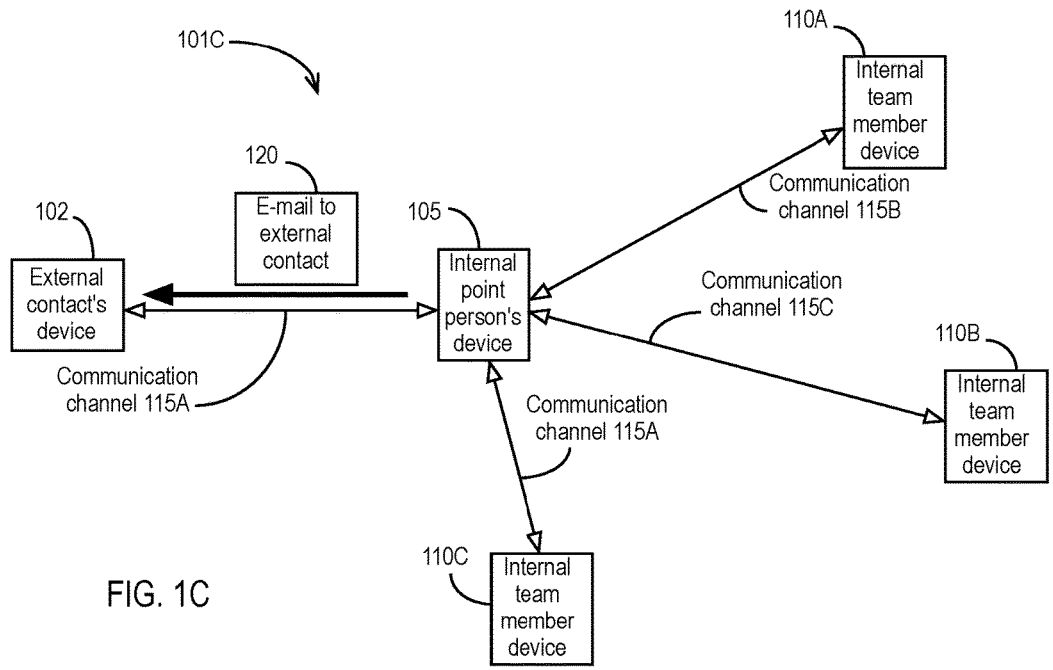
Figure 1D:
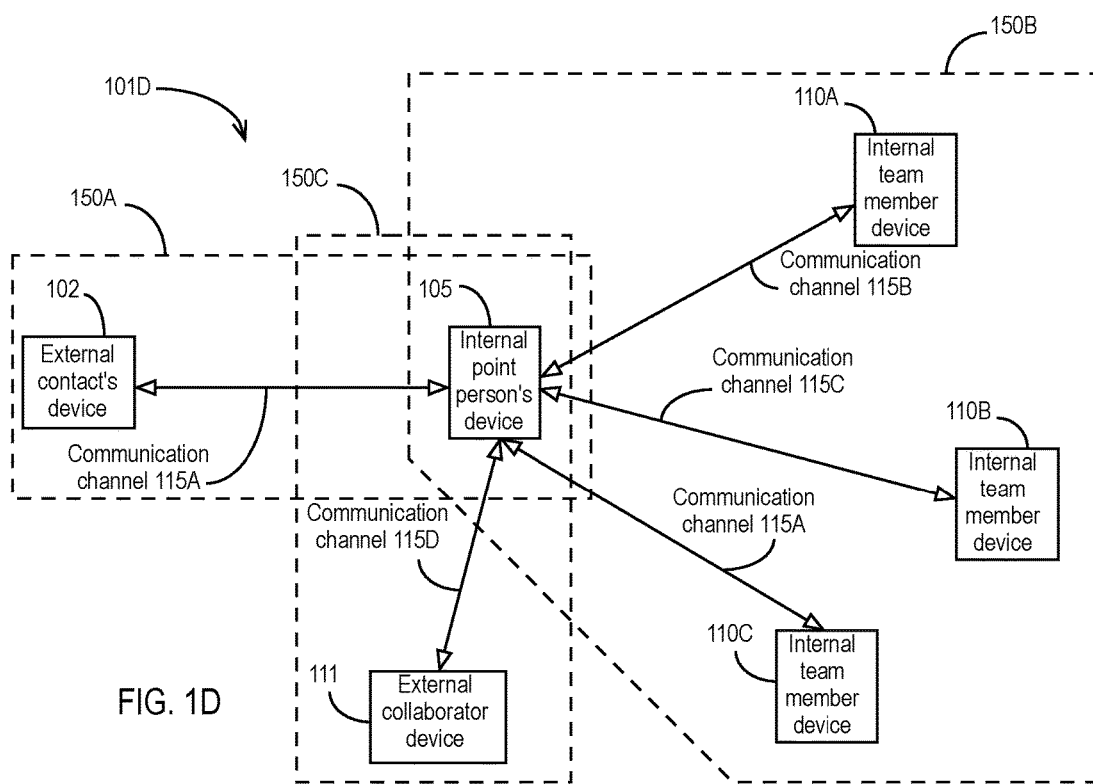

As illustrated in FIG. 1B, after receiving the e-mail 112 from the internal point person, the internal team members use their computing devices 110A, 110B, and 110C to provide information related to the e-mail 112. The responses may be through e-mail or through a collaboration tool, depending on how the internal point person initiated the communication. As shown in FIG. 1B, one internal team member sends a response 117 from internal team member computing device 110A over communication channel 115B; another internal team member sends a response 118 from internal team member computing device 110B over communication channel 115C; and a third internal team member sends a response 119 from internal team member computing device 110C over communication channel 115D. The three separate responses 117, 118, and 119 may create several complexities for the internal point person. For example, the response 117 may not co-copy the internal team members who are associated with the computing devices 110B or 110C (e.g., if the response 117 is an e-mail message, and the internal team member who sent it forgot to cc the other internal team members). As another example, the response 118 may conflict with the response 119. As yet another example, the response 119 may contain the same or similar information as the response 117, as may be the case if the team member associated with the computing device 110C did not see the response 117 before replying (e.g., when the response 117 was an e-mail, and the internal team member sending the response 119 was not cc'd on the response 117). As a result of these inefficiencies, the internal point person may be in a position of having to sift through potentially conflicting or redundant responses from internal team members before he or she can eventually generate and send a response (e.g., an e-mail 120) to the external contact, as shown in FIG. 1C.

Furthermore, the external contact may send a second e-mail to the internal point person while the internal team members and internal point person are communicating amongst themselves about the original e-mail 112, and before the internal point person has replied to the original e-mail 112. For example, the external contact may send a second e-mail with additional or follow-up questions, or he may modify his original question, communicate a deadline, or communicate any other information that might affect the internal point person's response to the original e-mail 112. Until the internal point person forwards information from the second e-mail to the internal team members (e.g., vi e-mail or through a collaboration tool), and possibly to additional team members to whom the internal point person did not send the original e-mail 112, the internal team members may be wasting time on an outdated request, or they may not be spending time on an updated or more urgent request from the external contact. The internal point person may therefore be a bottleneck that adversely affects the team's ability to provide timely and accurate information to address requests from external contacts.

These problems may be compounded when an external contact's request of the internal point person requires the internal point person to obtain information from an external collaborator (e.g., a partner entity or a supplier to the internal point person's company). In this case, illustrated in FIG. 1D, the internal point person may need to maintain parallel communication threads 150 and coordinate the exchange of information between those threads. In the example illustrated in FIG. 1D, the thread 150A is between the internal point person's computing device 105 and the external contact's computing device 102; the thread 150B is between the internal point person's computing device 105 and the internal team members' computing devices 110 (for, e.g., the exchange of company-proprietary information); and the thread 150C is between the internal point person's computing device 105 and an external collaborator's computing device 111 (for, e.g., the exchange of information that can safely be communicated between the company and the external collaborator). Consequently, in the situation shown in FIG. 1D, the internal point person must now manage more communication threads, and the likelihood that the internal point person delays or neglects to forward a pertinent communication, whether from the external contact, the external collaborator, or an internal team member, increases. The inefficiencies associated with FIG. 1D can therefore result in further decreased efficiency in communications between the various stakeholders.

Although internal collaboration tools (e.g., Slack, Yammer, Chatter, Convo, Glip, etc.) help facilitate communications among people within an organization, they do not address the problem that the internal point person may be a bottleneck that delays or prevents internal team members from accessing electronic communications sent by the external contact to the internal point person. Moreover, internal collaboration tools do not facilitate electronic communications between the internal point person and an external collaborator, or between the internal team members and the external collaborator, or between the internal point person and the external contact. Those communications typically take place over e-mail.

Another problem with internal collaboration tools is that the internal point person who receives an e-mail from an external contact or an external collaborator must copy content from that e-mail and paste it into the collaboration tool in order to make the e-mail's content available to the internal team members in the collaboration tool. Existing internal collaboration tools do not provide for the automated importation of the content of an e-mail from an external contact or an external collaborator into the internal collaboration tools.

Disclosed herein are embodiments of a communication facilitation system 100 that enables more timely and efficient communications among stakeholders by reducing the likelihood that the internal point person restricts, misses, or delays incoming communications from an external contact and/or a trusted external collaborator. The disclosed systems and methods facilitate more seamless communications between the internal point person and internal team members and, possibly, among internal team members and an external collaborator by bridging the gap between e-mail communications and the more real-time internal communications enabled by internal collaboration tools. In addition, they allow trusted external collaborators to participate in internal discussions. Advantages of the disclosed communication facilitation system 100, and the methods it performs, include more efficient communications among stakeholders and a better experience for the external contact. The disclosed methods and systems avoid communication inefficiencies caused, for example, by internal team members neglecting to "reply all" to an e-mail forwarded by the internal point person, which may lead to conflicting, redundant, or untimely responses to an external contact's e-mail 112. Furthermore, because the internal point person, the internal team members, and, if included, the external collaborator have access to complete and current information about the ongoing discussion related to an external contact's request, the involved stakeholders need not sift through outdated or irrelevant communications to understand the status of the effort to respond to the external contact. Consequently, when the internal point person determines that it is time to send a response to the external contact, the internal point person has access to all of the relevant internal discussions (as well as those with an external collaborator, if present) and can more easily synthesize those discussions to craft a response to the external contact. The internal point person's e-mail to the external contact may be sent by the disclosed communication facilitation system 100 or using a conventional e-mail program or application.

Figure 2:
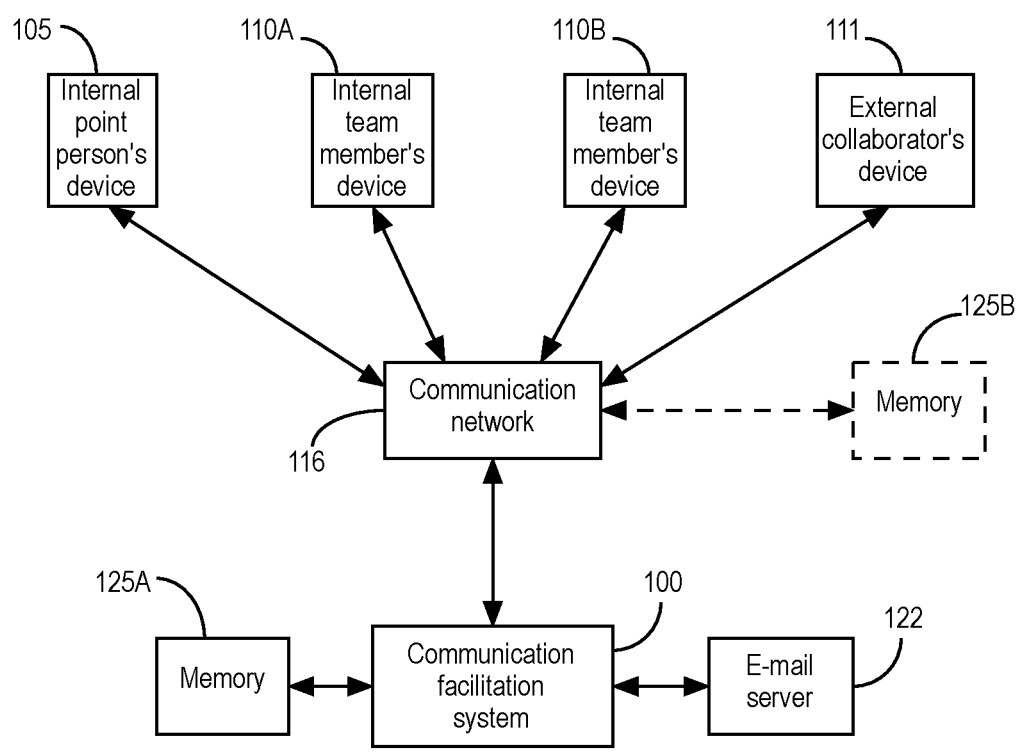
FIG. 2 is a block diagram illustrating elements of a communication facilitation system in accordance with some embodiments.

FIG. 2 is a block diagram illustrating the communication facilitation system 100 in relation to the internal point person, internal team members, and an external collaborator in accordance with some embodiments. A communication facilitation system 100 communicates over a communication network 116 with various computing devices associated with the members of an internal collaboration network. As shown in FIG. 2, the computing devices may include, for example, an internal point person's computing device 105 (i.e., a device associated with or used by the internal point person), one or more internal team members' computing devices 110 (i.e., devices respectively associated with or used by the one or more internal team members), and potentially an external collaborator's computing device 111 (i.e., a device associated with or used by the external collaborator). The computing devices 105, 110, and 111 may be any type of computing devices capable of electronic communication. For example, in some embodiments, one or more of the computing devices 105, 110, and 111 is a mobile device such as a smartphone (e.g., an iPhone™ or Android™ device), a tablet (e.g., an iPad™) or a laptop computer. Any of the computing devices may alternatively be a desktop computer.

The communication facilitation system 100 also communicates with an e-mail server 122 that handles e-mail between the internal point person and the external contact. The e-mail server 122 may be a conventional e-mail server. The communication facilitation system 100 and the e-mail server 122 may communicate via a wired or wireless network, including the communication network 116. In some embodiments, the communication facilitation system 100 is a cloud-based server. The communication facilitation system 100 establishes an internal collaboration network that enables the internal point person, the internal team member(s), and, if present, the external collaborator to communicate more seamlessly than they could communicate solely by using e-mail (e.g., the internal collaboration network removes the internal point person as a bottleneck). The members of the internal collaboration network are referred to herein collectively as the membership.

The communication facilitation system 100 may define by default, or allow an administrator (e.g., the internal point person) to define, privileges that may be granted to or restrictions that may be imposed upon any or all of the people in the membership. For ease of terminology, this document refers to all such privileges and restrictions as "privileges," where it is to be understood that this term encompasses both privileges granted to one or more members of the membership and restrictions imposed on one or more members of the membership. Such privileges may include, for example, one or more of the following: (a) the ability or inability to communicate electronically with the external contact using the communication facilitation system 100; (b) the ability or inability to modify (e.g., add people to or delete people from) the membership; (c) the ability or inability to grant or revoke one or more privileges of at least one of the members (e.g., an internal team member or an external collaborator); (d) the ability or inability to specify a friendly domain (discussed below) to the communication facilitation system 100.

In some embodiments, the communication facilitation system 100 grants one or more privileges to various members of the membership by default based on their positions or roles within the internal collaboration network. For example, in some embodiments, the communication facilitation system 100 grants one or more privileges to the internal point person based solely on that person's status as the internal point person. Such privileges may include, for example, one or more of the following: (a) the ability to communicate electronically with the external contact using the communication facilitation system 100; (b) the ability to modify (e.g., add members to or delete members from) the membership; (c) the ability to grant or revoke one or more privileges of at least one of the members (e.g., an internal team member or an external collaborator); (d) the ability to specify a friendly domain to the communication facilitation system 100.

In some embodiments, the communication facilitation system 100 grants one or more privileges to the internal team member(s) and/or to external collaborators (if present) by default. In some embodiments, if an internal team member or an external collaborator in the membership was one of the recipients of the original e-mail 112 to or from the external contact, the communication facilitation system 100 grants a first set of one or more privileges to the internal team member or to the external collaborator, and if the internal team member or the external collaborator was not one of the recipients of the original e-mail 112 to or from the external contact, the communication facilitation system 100 grants a second set of one or more privileges, which may include restrictions or more limited privileges. In other embodiments, the communication facilitation system 100 grants no privileges at all to internal team members or external collaborators who were not recipients of the original e-mail 112. For example, the communication facilitation system 100 may allow members who were recipients of the original e-mail 112 to communicate with the external contact using the communication facilitation system 100, but deny the ability to communicate to the external contact from the communication facilitation system 100 to those members in the membership who were not recipients of the original e-mail 112. As another example, the communication facilitation system 100 may allow those members in the membership who were not recipients of the original e-mail 112 to view communications made in, but not participate in, the internal collaboration network (e.g., those members who were not recipients of the original e-mail 112 may be able to follow but not participate in the discussions within the internal collaboration network).

In some embodiments in which the communication facilitation system 100 grants default privileges to one or more members of the membership, a system administrator or the internal point person (who may be the system administrator or the administrator of the internal collaboration network) has the ability to override the default privileges or establish custom privileges for some or all of the members, either on an individual basis or by establishing custom privileges for each category of member (e.g., where such categories might be members who were recipients of the e-mail 112, members who were added by the internal point person after the internal collaboration network was established, members who are external collaborators, etc.). The privileges of a selected member of the membership may be the same as or different from the privileges granted to the internal point person. Moreover, the privileges granted to a first person in the membership may be different from the privileges granted to a second person in the membership. For example, a first internal team member may be granted a different set of privileges than a second internal team member. As another example, an internal team member may be granted a different set of privileges than an external collaborator.

In some embodiments, as discussed in more detail below, the communication facilitation system 100 grants one or more privileges to the internal team members or to external collaborators based on an explicit request from the internal point person (e.g., received from the computing device 105). These privileges may be granted instead of or to override default privileges that would otherwise apply.

Referring again to FIG. 2, the communication facilitation system 100 may include memory (e.g., the block labeled 100 may include memory), or it may access external memory such as memory 125A, as shown. Optionally, the communication facilitation system 100 may communicate through the communication network 116 with memory 125B in the cloud (e.g., hosted or otherwise provided by a cloud storage provider). Whether internal or external to the communication facilitation system 100, the memory 125 may store information managed by or used by the communication facilitation system 100 to facilitate communications between the various stakeholders (e.g., the internal point person, the internal team members, the external contact, and, if present, the external collaborator). For example, the memory 125 may store any or all of the following: information identifying the members of the membership; information about the e-mail 112 or another communication upon which a request to create an internal collaboration network is based; communications (or information about communications) that have taken place over the internal collaboration network; information identifying designated friendly domains (discussed below); and/or information identifying one or more privileges applicable to various members in the membership. In some embodiments, the communication facilitation system 100 does not store communications that previously took place over the internal collaboration network. In some such embodiments, the communication facilitation system 100 deletes the content of communications over the internal collaboration network after the communication facilitation system 100 has sent those communications to the members' computing devices. In some embodiments, some or all of the information stored in the memory 125 is encrypted.

Figure 3:
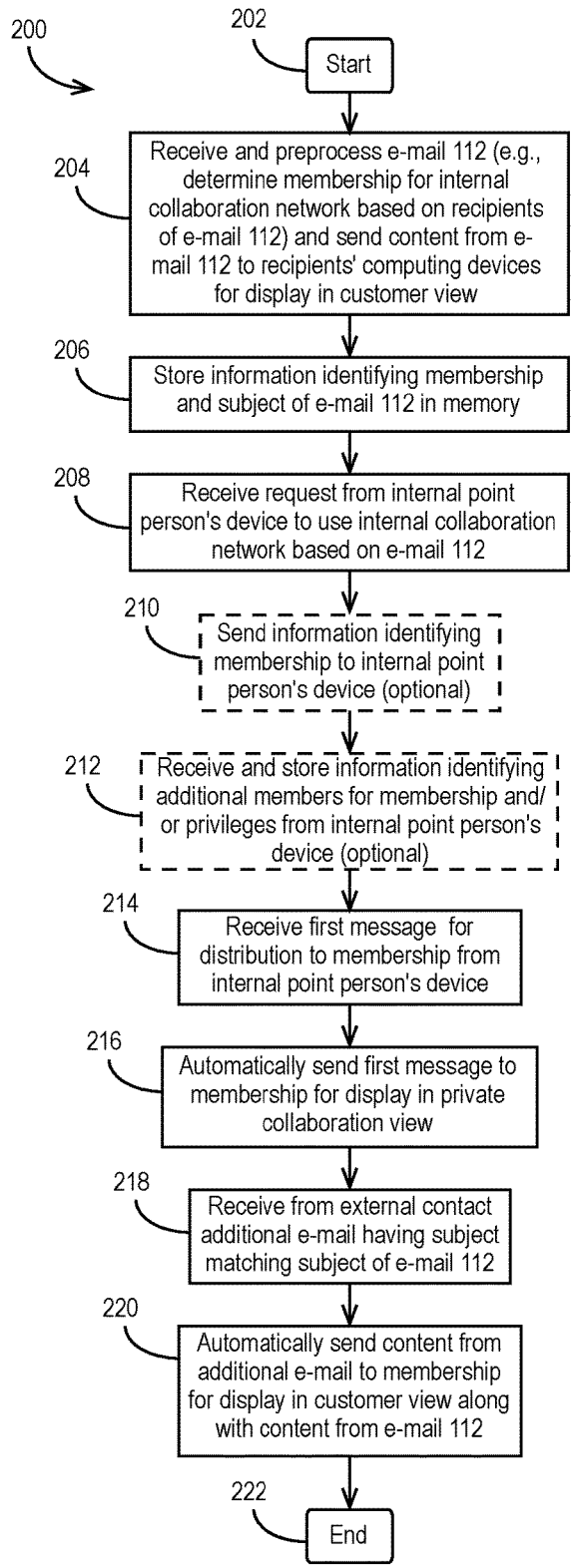
FIG. 3 is a flowchart of a method of facilitating electronic communication between an external contact and an internal point person, and between the internal point person and one or more internal team members, in accordance with some embodiments.

FIG. 3 is a flowchart 200 of a method of facilitating electronic communication between an external contact and an internal point person, and between the internal point person and one or more internal team members, in accordance with some embodiments. The method of FIG. 3 may be implemented by the communication facilitation system 100. At 202, the method begins. At 204, the communication facilitation system 100 receives, from the e-mail server 122, an e-mail 112 that an authorized user of the communication facilitation system 100 (e.g., the internal point person or an internal team member) has sent to or received from the external contact. In some embodiments, including the one shown in FIG. 3, at 204, the communication facilitation system 100 also preprocesses the e-mail 112 received or sent by the authorized user before any authorized user has indicated an intent to use an internal collaboration network. In some such embodiments, after preprocessing the e-mail 112, the communication facilitation system 100 sends, to the computing devices associated with the recipients of the e-mail 112 (e.g., the internal point person's computing device 105, and the computing devices of others, such as internal team members who were also recipients of the e-mail 112) information that enables an application (sometimes referred to as an "app") on each computing device 105, 110 to present at least a portion of the content of the e-mail 112 in a first view, referred to herein as the "customer view."

The e-mail 112 has a subject (e.g., the "subject" line) and recipient information (e.g., the e-mail addresses listed in the "to," "from," and/or "cc" fields). As used herein, unless indicated otherwise, the term "recipient information" includes the person whose e-mail address appears in the "from" field. As part of the preprocessing, the communication facilitation system 100 identifies the membership for the internal collaboration network based on recipient information from the e-mail 112. The membership includes the internal point person and excludes the external contact to or from whom the e-mail 112 was sent or received. In some embodiments, the communication facilitation system 100 identifies the membership by examining metadata associated with the e-mail 112. In some embodiments, the communication facilitation system 100 examines a list of recipients of the e-mail 112 (e.g., the "to" or "cc" lists) and the sender of the e-mail 112 (e.g., the "from" field). In some such embodiments, the communication facilitation system 100 collects the e-mail address of the sender of the e-mail 112 or at least one e-mail address from the list of recipients of the e-mail 112.

In some embodiments, the communication facilitation system 100 identifies the membership for the internal collaboration network by searching the e-mail 112 for a domain name that identifies a specified entity, which may be a company. For example, if the internal point person works for a company called ACME, and his e-mail address is IPP@acme.com, the communication facilitation system 100 may search the entire e-mail 112 or only a portion of the e-mail 112 (e.g., metadata, "to/from/cc" fields, etc.) for the domain name "acme.com" and collect some or all e-mail addresses ending in "acme.com" to identify the initial membership for the internal collaboration network. In some embodiments, discussed below, the communication facilitation system 100 identifies the initial membership by searching not only for the internal point person's company's domain name, but also for one or more additional "friendly" domain names, such as those associated with trusted partners (i.e., external collaborators) whom the internal point person wants included in the internal collaboration network or who are otherwise authorized to be added to the internal collaboration network (e.g., people who work for an affiliate or parent company).

In some embodiments, the recipient information includes information that identifies the internal point person. In some embodiments, the recipient information includes information that identifies one or more internal team members or external collaborators who will be included in the internal collaboration network. The recipient information may include an e-mail address (e.g., an e-mail address associated with the internal point person or one of the internal team members or, if applicable, an e-mail address associated with an external collaborator, as discussed below).

At 206, the communication facilitation system 100 stores the information identifying the membership in memory, which, as stated above, may be internal to the communication facilitation system 100 or external (either collocated with the communication facilitation system 100 or accessible to the communication facilitation system 100 through the communication network 116 or some other network). For example, the communication facilitation system 100 may store the information identifying the membership in a database. In some embodiments, the database is a schemaless, non-relational database.

In some embodiments, the information identifying the membership comprises a list of at least one e-mail address, including an e-mail address associated with the internal point person but excluding the e-mail address of the external contact. In some embodiments, the information identifying the membership also includes an e-mail address of one of the internal team members. In some embodiments, the information identifying the membership includes an e-mail address of an external collaborator.

Also at 206, the communication facilitation system 100 stores information identifying the subject of the e-mail 112 in the memory 125 (e.g., in a database). It is to be understood that although both information identifying the membership and information identifying the subject of the e-mail are stored in memory at block 206, the information identifying the membership and the information identifying the subject of the e-mail need not be stored at the same time or through the same operation of the communication facilitation system 100. Moreover, the communication facilitation system 100 may store the information identifying the membership and the information identifying the subject of the e-mail in any convenient way, such as in a single physical memory or in multiple memories (e.g., part locally and part in a cloud-based memory 125B).

At 208, the communication facilitation system 100 receives a request to use the internal collaboration network based on the e-mail 112 from the computing device 105 associated with the internal point person. The request is associated with the e-mail 112 that was previously either sent to an external contact (e.g., a customer) from the internal point person or received by the internal point person from the external contact. In some embodiments, the application on the internal point person's computing device 105 includes an icon or button that the internal point person can select to trigger (i.e., generate) the request to use the internal collaboration network based on the e-mail 112. In other embodiments, the internal point person may initiate the use of the internal collaboration network by communicating the intent to use the internal collaboration network in some other way (e.g., by sending a text message to the communication facilitation system 100). In some embodiments, in response to the internal point person requesting use of the internal collaboration network, the internal point person's computing device 105 begins presenting an private collaboration view in addition to the customer view. In such embodiments, the customer view displays all communications between the internal point person and the external contact having the subject of the original e-mail 112, and the private collaboration view displays all communications between the members of the internal collaboration network (e.g., communications among the internal point person, internal team member(s), and, if applicable, the external contact). In some embodiments, the internal point person may flip, swipe, toggle, or scroll between the customer view and the private collaboration view.

At 210, the communication facilitation system 100 optionally sends information identifying the membership to the internal point person's computing device 105. For example, the communication facilitation system 100 may send a list of names of people who are in the membership. As another example, the communication facilitation system 100 may send a list of e-mail addresses associated with the people (e.g., the internal point person and internal team member(s)) who are members of the internal collaboration network. As another example, the communication facilitation system 100 may send one or more icons, graphics, or pictures that allow the internal point person to identify the members of the internal collaboration network. If the communication facilitation system 100 sends the information identifying the membership to the internal point person's computing device 105, the communication facilitation system 100 may send any information that allows the internal point person's computing device 105 to present, to the internal point person, a listing identifying those who are part of the membership.

At 212, the communication facilitation system 100 optionally receives, from the internal point person's computing device 105, and stores in memory 125 information identifying additional people (e.g., internal team members, external collaborators, etc.) to add to the membership. For example, the internal point person may want to add to the membership additional team members who were not included as recipients of the selected e-mail 112 to or from the external contact, on which the request to create the internal collaboration network was based (see the discussion of block 204 above). Thus, at 212, the communication facilitation system 100 optionally receives, from the internal point person's computing device 105, information identifying additional members to add to the membership.

In some embodiments, also at 212, the communication facilitation system 100 optionally receives, from the internal point person's computing device 105, and stores in memory 125 (either locally or in cloud-based memory 125B) information identifying one or more privileges applicable to the additional people being added to the membership. As explained above, the privileges applicable to the people being added to the membership may differ from those applicable (by default or by virtue of having been established by the internal point person or an administrator) to members who were included in the membership because they were recipients of the e-mail 112 to or from the external contact. Moreover, the applicable privileges may be set by default, in which case the information received at block 212 may override or add to the default privileges.

It is to be understood that the information received at block 212 from the internal point person's computing device 105, which identifies members and/or privileges for those members, may differ from the information that is stored in memory to represent those members and/or privileges. Similarly, if the communication facilitation system 100 receives information identifying one or more privileges granted to additional members, that information need not be received at the same time as the information identifying those additional members. In other words, the internal point person may first select additional members for the membership and then define one or more privileges granted to one or more of the additional members. Alternatively, the internal point person may define one or more privileges first (e.g., to be applied to all internal team members or to all external collaborators) and then select additional members for the membership.

It is also to be understood that the block 212 is independent of the block 210, meaning that the communication facilitation system 100 may perform block 210 but not block 212, or it may perform block 212 but not block 210, or it may perform both or neither of blocks 210 and 212. Likewise, if included in a particular implementation, blocks 210 and 212 maybe performed at any time after the communication facilitation system 100 receives the e-mail 112 in block 204. They do not necessarily have to be performed after block 208 or before block 214. Furthermore, block 212 may be performed before block 210.

At 214, the communication facilitation system 100 receives, from the internal point person's computing device 105, a message for distribution to the internal collaboration network's membership for presentation in the private collaboration view of each member's computing device. For example, the message may welcome the members of the membership to the internal collaboration network, or it may provide context for the discussion in the internal collaboration network (e.g., by summarizing a request from the external contact, by requesting action, by setting a deadline, by including at least a portion of the e-mail 112, etc.). In some embodiments, the message is a text message. In other embodiments, the message is a chat message. The message may comprise a file (e.g., from the external contact or generated by the internal point person). For example, the file may comprise a document (e.g., text, a presentation, a picture, an audio file, etc.).

At 216, the communication facilitation system 100 automatically sends the message received at block 214 to the membership for presentation in the private collaboration view provided by the app on each member's computing device (e.g., 105, 110, 111). In this context, the word "automatically" means that the communication facilitation system 100 sends the message to the membership without any further instruction from the internal point person or anyone else in the membership. The communication facilitation system 100 forwards the message to the rest of the members of the membership because of their inclusion in the internal collaboration network, and the internal point person does not have to set up any sort of forwarding mechanism. In some embodiments, the communication facilitation system 100 automatically sends the message to the membership using a push notification service. For example, the communication facilitation system 100 may send the message automatically using the Apple™ Push Notification Service, the Google™ Cloud Messaging Service, a desktop notification service, or any other push notification service.

At 218, the communication facilitation system 100 receives, from the e-mail server 122, an additional e-mail from the external contact, where the subject of the additional e-mail matches the subject of the e-mail 112. The subject of the additional e-mail "matches" the subject of the e-mail 112 if the additional e-mail is part of the same communication sequence that includes the e-mail 112. For example, the subject of the additional e-mail matches the subject of the e-mail 112 if the subject line of the additional e-mail contains at least a portion of the content of the subject line of the e-mail 112. As a specific example, if the subject line of the e-mail 112 is "Proposal request," and the subject line of the additional e-mail is "Re: Proposal request" or "Fw: Proposal request" (or similar variations of e-mails sent in response to an original e-mail), the subject of the additional e-mail matches the subject of the e-mail 112. Because the subject of the additional e-mail matches the subject of the e-mail 112, the communication facilitation system 100 identifies the additional e-mail as associated with the internal collaboration network and, at 220, automatically sends content from the additional e-mail to the computing devices associated with the membership. In some embodiments, this content is delivered to the customer view of the app on each member's computing device (105, 110, 111). In some embodiments, the content is accessible from the private collaboration view as well as from the customer view. For example, the communication facilitation system 100 may send the body of the additional e-mail to the computing devices associated with the membership (e.g., potentially including the computing devices 105, 110, and 111) for display in at least the customer view and potentially also in the private collaboration view. Thus, each member of the membership has the ability to view all communications with the external contact having the same subject as the e-mail 112 in the customer view provided by the app on his/her computing device 105, 110, or 111, and each member of the membership has the ability to view all internal collaboration network communications associated with the e-mail 112 in the private collaboration view provided by the app. As a consequence, each member of the internal collaboration network can see all applicable external communications in a convenient single screen on his or her computing device, and each member can also see all internal collaboration network communications in another convenient single screen on his or her computing device. In some embodiments, members can toggle between the customer view and the private collaboration view. It is to be understood that the communications are still considered to be displayed in the same view even if a member has to scroll to view all communications in that view. In other words, the communications need not all be visible simultaneously on a screen to be considered displayed in the same view.

The additional e-mail from the external contact may include a file as an attachment. For example, the external contact may send an error report, a document containing test results, or any other document that the external contact wishes to share with the internal point person. The information that the communication facilitation system 100 automatically sends to the members' computing devices (e.g., 105, 110, 111) includes information that enables the members to access the file from screens showing the customer view and/or the private collaboration view on their respective computing devices (e.g., 105, 110, 111). For example, the communication facilitation system 100 may send information enabling each computing device 105, 110, 111 to present an icon or link that each member can select to access the file sent by the external contact from within the screen showing the customer view and/or the private collaboration view.

Figure 9:
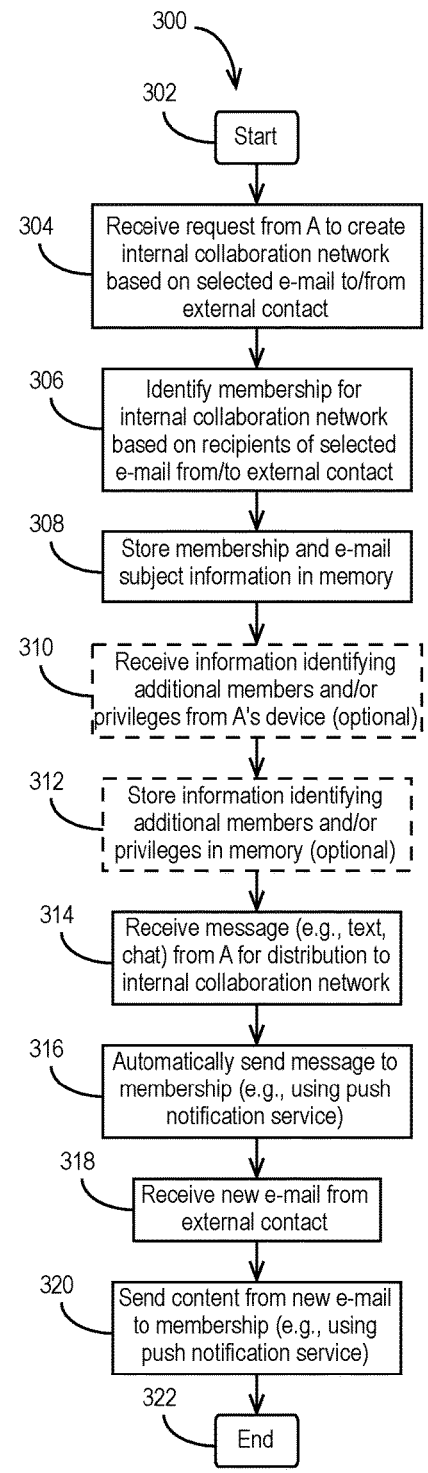
FIG. 9 illustrates the process performed in accordance with some embodiments when an internal point person requests that an internal collaboration network be established based on the e-mail illustrated in FIG. 8.

At 222, the method ends. It is to be understood that although FIG. 3 presents the blocks of the flowchart 200 in a certain order, the communication facilitation system 100 may perform some of the blocks in a different order. For example, the discussion above indicates that in some embodiments, the e-mail 112 is preprocessed and the internal collaboration network is configured before any authorized user has indicated a desire to use the internal collaboration network. Thus, in these embodiments, the internal collaboration network is configured for e-mail 112 even if the internal collaboration network is never used. In other embodiments, the communication facilitation system 100 may create the internal collaboration network only upon receiving an indication from an authorized user that use of an internal collaboration network is desired. For example, the flowchart 200 may begin with block 208, and blocks 204 and 206 may be moved between existing blocks 208 and 210. In such embodiments, the e-mail 112 is processed only after the communication facilitation system 100 has received a request to establish an internal collaboration network. Such an approach may decrease processing and/or memory requirements of the communication facilitation system 100. It is to be appreciated that FIG. 3 is one example of a method performed by the communication facilitation system 100 and does not exclude other embodiments. FIG. 9, discussed below, presents another example in which the communication facilitation system 100 performs the operations in a different order.

Figure 4:
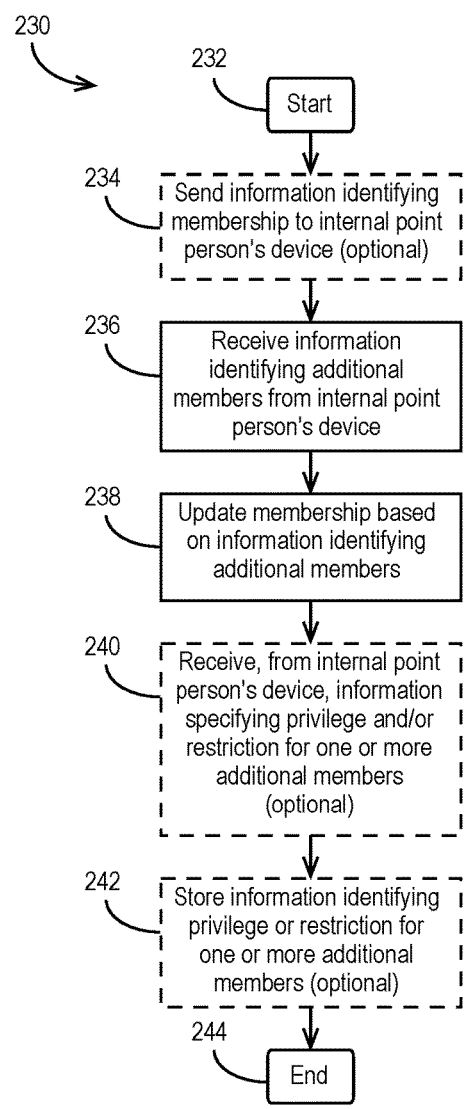
FIG. 4 is a flowchart that shows a method of adding members to the internal collaboration network in accordance with some embodiments.

In some embodiments, after the internal collaboration network has been established, the internal point person has the ability to add internal team members to the membership, even if the communication facilitation system 100 received information identifying additional members for the membership at block 212 of FIG. 3. In other words, in some embodiments the internal point person has the ability to add members (e.g., internal team members or external collaborators) to the internal collaboration network at any time after the internal collaboration network has been established. FIG. 4 illustrates a flowchart 230 that shows a method of adding additional members to the internal collaboration network in accordance with some embodiments. At 232, the method begins. At 234, the communication facilitation system 100 optionally sends information identifying the membership to the internal point person's computing device 105. This block is the same as block 210 of FIG. 3, discussed above. At 236, the communication facilitation system 100 receives, from the internal point person's computing device 105, information identifying one or more additional members (e.g., internal team members or external collaborators) to be added to the membership. At 238, the communication facilitation system 100 updates the membership based on the received information identifying the one or more additional members to be added to the internal collaboration network's membership. For example, the communication facilitation system 100 may update the memory 125 to reflect the addition of the one or more additional members.

At 240, the communication facilitation system 100 optionally receives, from the internal point person's computing device 105, information specifying a privilege granted to and/or a restriction imposed on one or more of the additional members being added to the membership, and, at 242, information identifying the specified privilege is optionally stored in memory. As explained above in the context of FIG. 3, the information specifying the privilege that is received from the internal point person's computing device 105 may differ from the stored information that identifies the privilege. If specified, the privilege may apply to some or all of the additional members being added to the membership. If specified, the privilege may also apply to internal team members who were already a part of the membership before the information was received at block 236.

FIG. 4 illustrates the blocks 234 through 242 in a particular order, but it is to be appreciated that some of the blocks may be performed in a different order. For example, if present, blocks 240 and 242 may be performed before blocks 234 (if performed), 236, and/or 238. Likewise, some of the blocks may be performed simultaneously. For example, the communication facilitation system 100 may update the membership based on the information identifying the additional members (block 238) at the same time it receives the information specifying a privilege or restriction (block 240).

Figure 5:
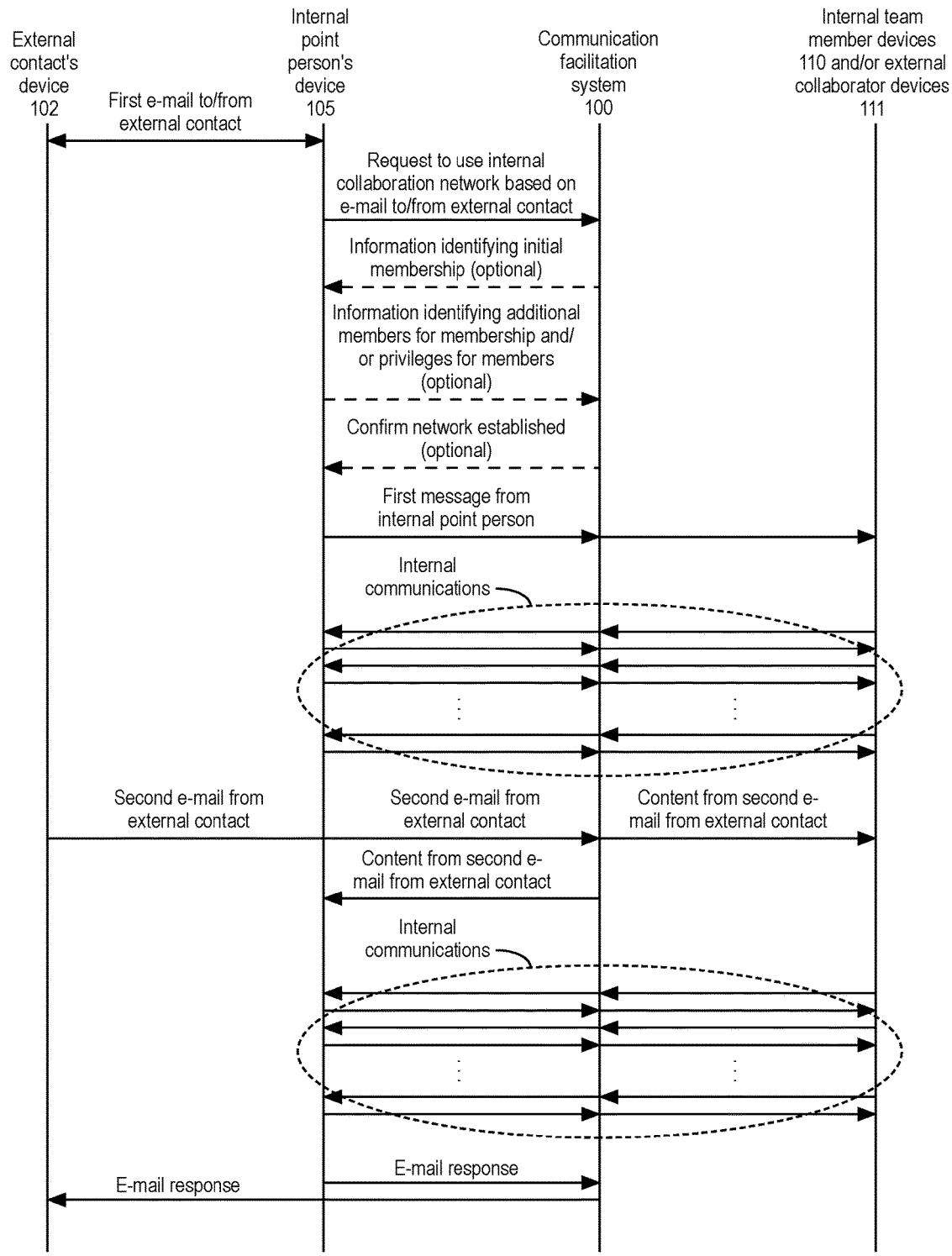
FIG. 5 is a timing diagram illustrating the various communications between an external contact's computing device, an internal point person's computing device, a communication facilitation system, and internal team members' devices in accordance with some embodiments.

In accordance with some embodiments, including as shown in FIG. 3, FIG. 5 shows a timing diagram illustrating the various communications between the external contact's computing device 102, the internal point person's computing device 105, the communication facilitation system 100, and the internal team members' devices 110 and/or the external collaborators' devices 111. The internal point person decides to use an internal collaboration network based on the first e-mail 112. As shown by the double-ended arrow of FIG. 5, the first e-mail 112 may be sent from the external contact's computing device 102 to the internal point person's computing device 105, or from the internal point person's computing device 105 to the external contact's computing device 102. Likewise, although not shown in FIG. 5, at least one internal team member may also be a recipient of the e-mail 112.

As discussed above, in some embodiments, the communication facilitation system 100 preprocesses the e-mail 112 so that the internal collaboration network has already been configured before the internal point person requests its use. In other embodiments, the communication facilitation system 100 waits to configure the internal collaboration network based on the e-mail 112 until after the internal point person has requested to use the internal collaboration network. The communications shown in FIG. 5 are applicable in both types of embodiments. To trigger the use of the internal collaboration network, the internal point person interacts with his/her computing device 105 to send to the communication facilitation system 100 a request to use the internal collaboration network based on the first e-mail 112. For example, the app on the internal point person's computing device 105 that presents the customer view and the private collaboration view may enable the computing device 105 to send the request to use the internal collaboration network to the communication facilitation system 100. For example, the app may provide an icon or button that the internal point person can select to trigger a request from the computing device 105 to the communication facilitation system 100 to use the internal collaboration network (whether established in advance or created on the fly).

In embodiments performing the blocks as ordered in flowchart 200 of FIG. 3, the communication facilitation system 100 has already configured the internal collaboration network by performing blocks 204 and 206, and members' computing devices already present content from the e-mail 112 in their respective customer views. In embodiments in which the communication facilitation system 100 configures the internal collaboration network on the fly (e.g., only when an authorized user requests it), upon receiving the request to use the internal collaboration network based on the first e-mail 112, the communication facilitation system 100 determines the membership and sends content from the e-mail 112 to the members' computing devices (e.g., 105, 110) for presentation in the customer view as discussed above in the context of FIG. 3. In either type of embodiment, the communication facilitation system 100 may also store information about default privileges that may apply to the initial members of the membership.

Optionally, as shown by the dashed arrow in FIG. 5, the communication facilitation system 100 sends information identifying the initial membership to the computing device 105 (see block 210 of FIG. 3 and block 234 of FIG. 4). Optionally, the communication facilitation system 100 receives, from the internal point person's computing device 105, information identifying additional members to be added to the membership and/or privileges for some or all of the members in the membership (see block 212 of FIG. 3 and blocks 236 through 242 of FIG. 4). Optionally, the communication facilitation system 100 sends to the internal point person's computing device 105 a confirmation that the internal collaboration network has been established. The optional communications shown in FIG. 5 may occur in any order (e.g., the confirmation may be sent first, the information identifying additional members may be sent first, the information identifying a privilege may be sent first, etc.).

After establishing the internal collaboration network, whether in advance or on the fly, the communication facilitation system 100 receives a first message from the internal point person's computing device 105 (see block 214 of FIG.

3). The first message is intended for the internal collaboration network and, therefore, for the private collaboration view on each of the members' computing devices. The communication facilitation system 100 automatically sends the first message to the internal team member computing devices 110 and, if the membership includes an external collaborator, to the external collaborator's computing device 111 (see block 216 of FIG. 3). The various computing devices 105, 110, and 111 (if present) then display the first message in their respective private collaboration views. The internal point person, the internal team members, and, if present, the external collaborator then engage in internal communications within the internal collaboration network, all of which are presented to members on their respective computing devices' private collaboration views.

Figure 6:
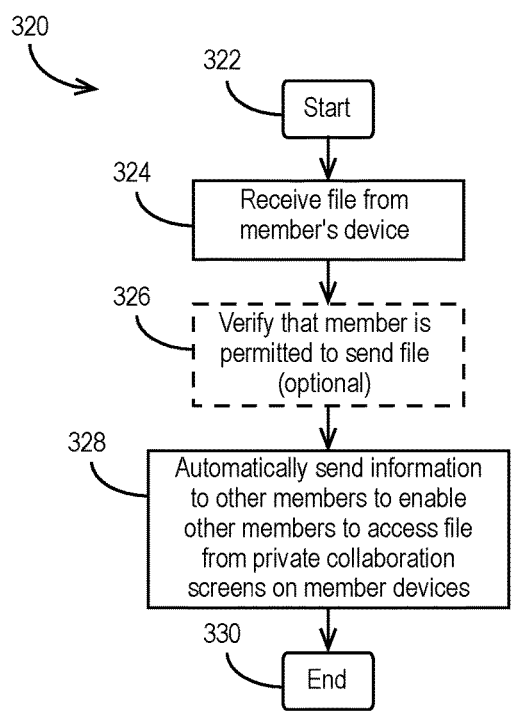
FIG. 6 illustrates a flowchart that explains the process when a member of an internal collaboration network sends a file to the internal collaboration network membership in accordance with some embodiments.

As part of the internal communications, in using the internal collaboration network, the members of the membership may send various types of communications. For example, the internal team members, the internal point person, or, if present, the external collaborator, may send chat or text messages, files (e.g., text, audio, video), etc. In some embodiments, at least one person in the membership is permitted to send a file through the communication facilitation system 100 for distribution to the members. FIG. 6 illustrates a flowchart 320 that explains the process when a member sends a file to the internal collaboration network membership. At 322, the process begins. At 324, the communication facilitation system 100 receives a file from a member's computing device (e.g., 105, 110, or 111). At 326, the communication facilitation system 100 optionally determines whether the member who sent the file is permitted to send files over the internal collaboration network. For example, the internal point person or an administrator of the internal collaboration network may have established a privilege that permits some members to send files to the membership, or a default privilege may govern whether a particular member is permitted to send files to the membership. If the member is not permitted to send files, the communication facilitation system 100 may delete the file and/or notify an administrator or the internal point person that the member attempted to send a file to the rest of the membership. In some embodiments in which a member who is not permitted to send files attempts to send a file to the membership, the administrator or the internal point person can direct the communication facilitation system 100 to send the file to the membership, despite the fact that the member who sent it did not have permission to do so. If, at 326, the communication facilitation system 100 verifies that the member is permitted to send files, then, at 328, the communication facilitation system 100 automatically sends information to the members' computing devices (e.g., 105, 110, 111), where the information enables the members to access the file from their private collaboration view screens on their respective computing devices (e.g., 105, 110, 111). For example, the communication facilitation system 100 may send information enabling each computing device 105, 110, 111 to present an icon or link that each member can select to access the file from within the private collaboration view screen. At 330, the process ends.

As described above, the internal team members may have privileges that differ from each other and/or from the internal point person. As an example, different members of the membership may have different privileges for files shared in the internal collaboration network. For example, some members (e.g., the internal point person only, or the internal point person and selected internal team members, etc.) may be permitted to send files to the membership, to open files sent to the membership, to download files to the membership, etc., whereas other members (e.g., other selected internal team members, external collaborators (if present), etc.) may be able to send files but not access, open, or download files sent by others. It is to be understood that myriad permissions may be defined and enforced to grant or restrict access to subsets or types of information flowing over the internal collaboration network, and the examples provided herein are not intended to be limiting.

Referring again to FIG. 5, at some point after the internal collaboration network has been established, the external contact's device 102 may send a second e-mail having the same subject as the first e-mail to a list of recipients including at least the internal point person. Because the internal collaboration network has been established, the communication facilitation system 100 identifies the second e-mail as having the same subject as the first e-mail 112 and automatically sends content from the second e-mail to the internal point person's computing device 105, to the internal team members' computing devices 110, and, if present, the external collaborator's computing device 111. In some embodiments, the various computing devices 105, 110, 111 present the content from the second e-mail in the customer view. Some or all of the content may also or alternatively be presented in the private collaboration view. The members may then engage in additional internal communications within the internal collaboration network, as shown in FIG. 5.

Figure 7:
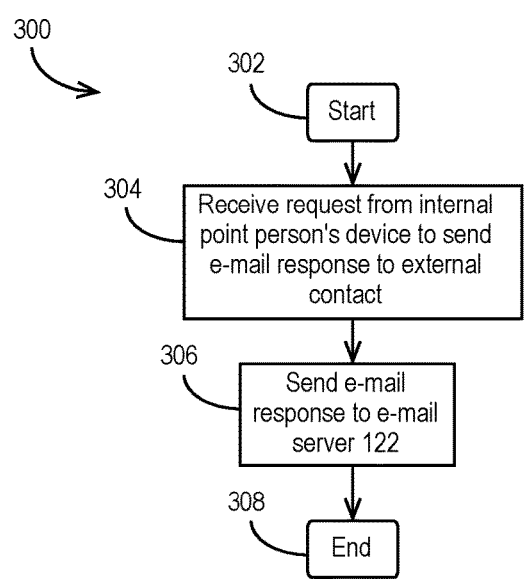
FIG. 7 is a flowchart describing how an internal point person may send an e-mail response to an external contact in accordance with some embodiments.

When the internal point person decides to respond to the external contact, he or she may use the communication facilitation system 100 to send an e-mail response to the external contact as shown at the bottom of FIG. 5. In some embodiments, the internal point person types a response in the customer view of the computing device 105, and the communication facilitation system 100 delivers this response to the e-mail server 122 for delivery to the external contact using conventional means. FIG. 7 is a flowchart 300 describing this part of the process from the viewpoint of the communication facilitation system 100. At 302, the process begins. At 304, the communication facilitation system 100 receives a request from the internal point person's computing device 105 to send an e-mail to the external contact. The request may include, for example, text and/or attachments to be sent to the external contact in an e-mail. At 306, the communication facilitation system 100 sends the e-mail to the e-mail server 122. At 308, the process ends.

Figure 8:
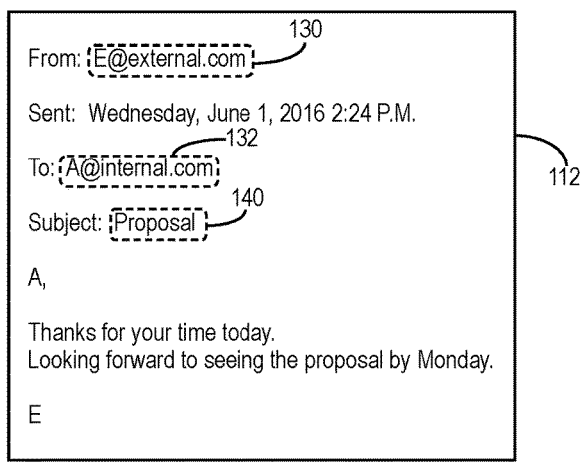
FIG. 8 shows an exemplary e-mail received from an external contact.
Figure 10:
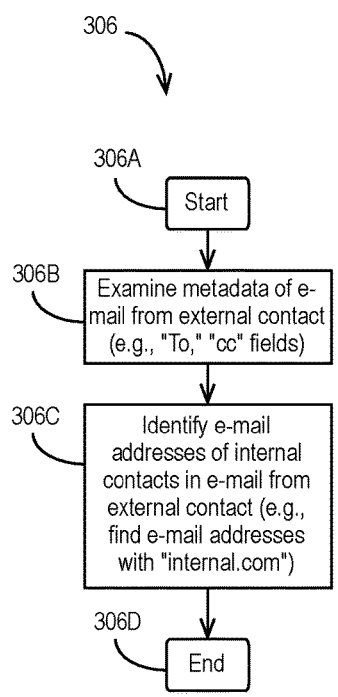
FIG. 10 illustrates how membership for an internal collaboration network may be determined in accordance with some embodiments.

FIGS. 8 through 10 provide a specific example to illustrate the process of the communication facilitation system 100 establishing an internal collaboration network in accordance with some embodiments. In the example described, the internal collaboration network is configured in response to a user's request in connection with a received e-mail 112. As explained above in the discussion of FIG. 3, the communication facilitation system 100 may alternatively create the internal collaboration network before receiving any instruction or request from a user. Thus, the example of FIGS. 8 through 10 is not meant to be limiting.

FIG. 8 shows an exemplary e-mail 112 received from an external contact. (As explained above, the e-mail upon which a request to establish an internal collaboration network is based may alternatively be an e-mail sent to the external contact.) In FIG. 8, the external contact's e-mail address 130 is "E@external.com," the internal point person's e-mail address 132 is "A@internal.com," and the subject 140 of the e-mail is "Proposal."

FIG. 9 illustrates the process 300 performed by the communication facilitation system 100 in accordance with some embodiments when the internal point person, A, requests that an internal collaboration network be established based on the e-mail 112 from E illustrated in FIG. 8. The process 300 is consistent with the process 200 illustrated in FIG. 3, although, as explained above, the internal collaboration network is not configured in FIG. 9 until after the communication facilitation system 100 receives a request from the internal point person.

At 302, the process starts. At 304, the communication facilitation system 100 receives a request from A to create an internal collaboration network based on the e-mail 112 shown in FIG. 8. At 306, the communication facilitation system 100 identifies the membership for the internal collaboration network based on the recipients of the e-mail 112 shown in FIG. 8. FIG. 10 illustrates one way in which the communication facilitation system 100 may accomplish block 306 of FIG. 9 (or the preprocessing task of block 204 of FIG. 3) based on an e-mail 112 sent by or to an external contact. At 306A, the process starts. At 306B, the communication facilitation system 100 examines metadata of the e-mail 112 to or from the external contact (e.g., the e-mail illustrated in FIG. 8 or any other e-mail 112). For example, the communication facilitation system 100 may examine the "to," "from," and "cc" fields of the e-mail 112. At 306C, the communication facilitation system 100 identifies the e-mail addresses of the membership based on the metadata. In the example illustrated, the communication facilitation system 100 identifies e-mail addresses associated with the domain "internal.com," because that is the domain associated with the internal point person, A. When the communication facilitation system 100 processes the example e-mail 112 shown in FIG. 8, the only e-mail address the communication facilitation system 100 finds is "A@internal.com."

Figure 11A:
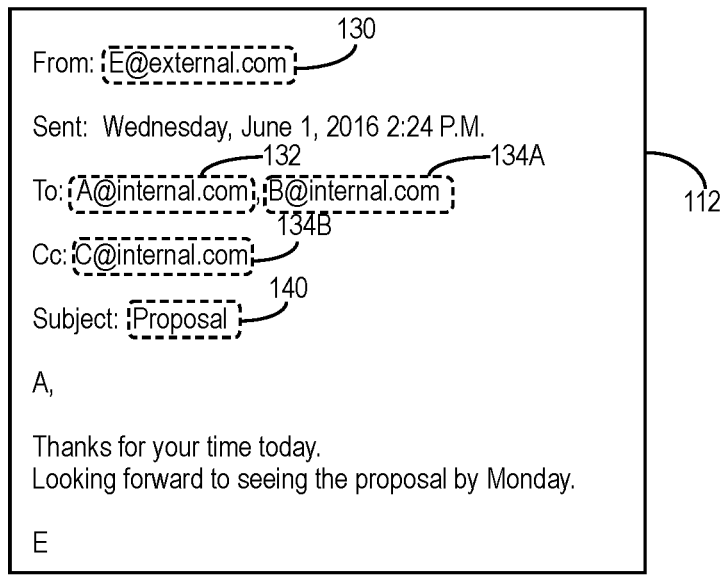
FIGS. 11A and 11B show examples of e-mails sent by an external contact.
Figure 11B:
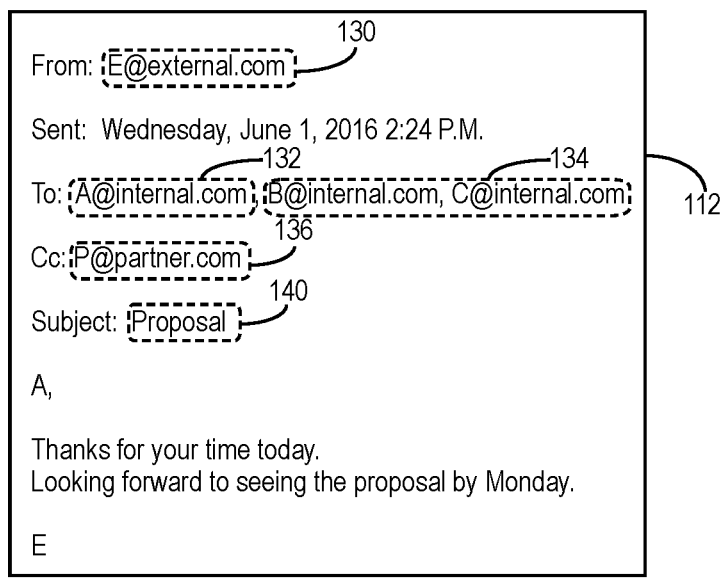

FIGS. 11A and 11B show examples of e-mails 112 sent to additional recipients. For the e-mail 112 of FIG. 11A, a communication facilitation system 100 following the process illustrated in FIG. 10 would identify the e-mail addresses 132 ("A@internal.com"), 134A ("B@internal.com"), and 134B ("C@internal.com") as the initial members of the membership. In some embodiments, because A requested to establish the internal communication network, A is automatically designated as the internal point person, and B and C are designated as internal team members. In other embodiments, B (whose e-mail address appears in the "to" field) but not C (whose e-mail address appears in the "cc" field) can initiate the establishment of the internal collaboration network. In yet other embodiments, A, B, or C can initiate the establishment of the internal collaboration network. If the communication facilitation system 100 receives the request to create the internal collaboration network from someone other than the desired internal point person (assumed to be A in these examples), the desired internal point person can then commandeer the position of internal point person, or the person who initiated the internal collaboration network can designate the desired internal point person as the internal point person.

FIG. 11B is an example of an e-mail 112 used to establish an internal collaboration network that includes in its recipient list an external collaborator, P. For the e-mail 112 of FIG. 11B, a communication facilitation system 100 following the process illustrated in FIG. 10 would identify the e-mail addresses 132 ("A@internal.com") and 134 ("B@internal.com" and "C@internal.com") as belonging to the initial members of the membership. In some embodiments, the communication facilitation system 100 also includes the e-mail 136 ("P@partner.com") in the membership if the domain "partner.com" has been designated a "friendly domain" by an administrator (e.g., the internal point person) of the communication facilitation system 100 for the company using the domain "internal.com" or for the internal collaboration network being created. In some embodiments, the internal point person or a person acting as the administrator of the communication facilitation system 100 is able to specify that the domain "partner.com" is a friendly domain, which allows the internal point person to manually add to the internal collaboration network any e-mail address including that domain name. In other embodiments, the internal point person or a person acting as the administrator of the communication facilitation system 100 may specify that the domain "partner.com" is a friendly domain, and the communication facilitation system 100 automatically adds any e-mail address found in e-mail 112 having that domain name to the internal collaboration network. In some embodiments, if the communication facilitation system 100 does not recognize the domain "partner.com" as a friendly domain, but the internal point person wishes to add P to the internal collaboration network, the internal point person may add P manually, as described below in the discussion of FIG. 12.

Referring again to FIG. 9, at 308, the communication facilitation system 100 stores membership information in memory. For example, the communication facilitation system 100 may store a list of e-mail addresses of the members in memory 125. Also at 308, the communication facilitation system 100 stores information identifying the subject of the e-mail 112 in memory. As stated previously in the context of FIG. 3, the communication facilitation system 100 may store the information identifying the membership and the information identifying the e-mail subject separately or at different times.

At 310, the communication facilitation system 100 optionally receives information identifying additional members to be added to the membership and/or privileges to be granted to some or all of the members of the membership. As explained above, the information identifying additional members and the information identifying privileges to be granted may be received separately or at different times and in any order. Moreover, as stated earlier, the word "privileges" encompasses both privileges granted to and restrictions placed on members of the membership, and privileges may apply to a subset or all of the members of the membership. Furthermore, the internal point person, internal team members, and external collaborators may have the same or different privileges, and different internal team members may have different privileges. At 312, the communication facilitation system 100 optionally stores the information identifying additional members and/or privileges received at block 310 in memory 125.

At 314, the communication facilitation system 100 receives, from A's computing device 105, a message for distribution to the internal collaboration network's membership. The message may be, for example, a text message, a chat message, an audio message, or any other type of message that the communication facilitation system 100 can send to the membership over the communication network.

At 316, the communication facilitation system 100 automatically sends the message received at block 314 to the membership for presentation in each member's computing device's private collaboration view. As explained above in the context of FIG. 3, the communication facilitation system 100 may automatically send the message to the membership using a push notification service (e.g., the Apple™ Push Notification Service, the Google™ Cloud Messaging Service, a desktop notification service, or any other push notification service).

At 318, the communication facilitation system 100 receives, from E, an additional e-mail having the same subject as the e-mail 112. Because the subject of the additional e-mail matches the subject of the e-mail 112, the communication facilitation system 100 identifies the additional e-mail as associated with the internal collaboration network and, at 320, automatically sends content from the additional e-mail to the computing devices associated with the membership (e.g., using a push notification service as described above). In some embodiments, the communication facilitation system 100 sends information configured to cause each member's computing device (e.g., 105, 110, 111) to display content from the additional e-mail in the customer view of the app. In some embodiments, the communication facilitation system 100 sends information configured to cause each member's computing device (e.g., 105, 110, 111) to present content from the additional e-mail in the private collaboration view screen along with the message sent at block 316. At 322, the process ends.

Figure 12:
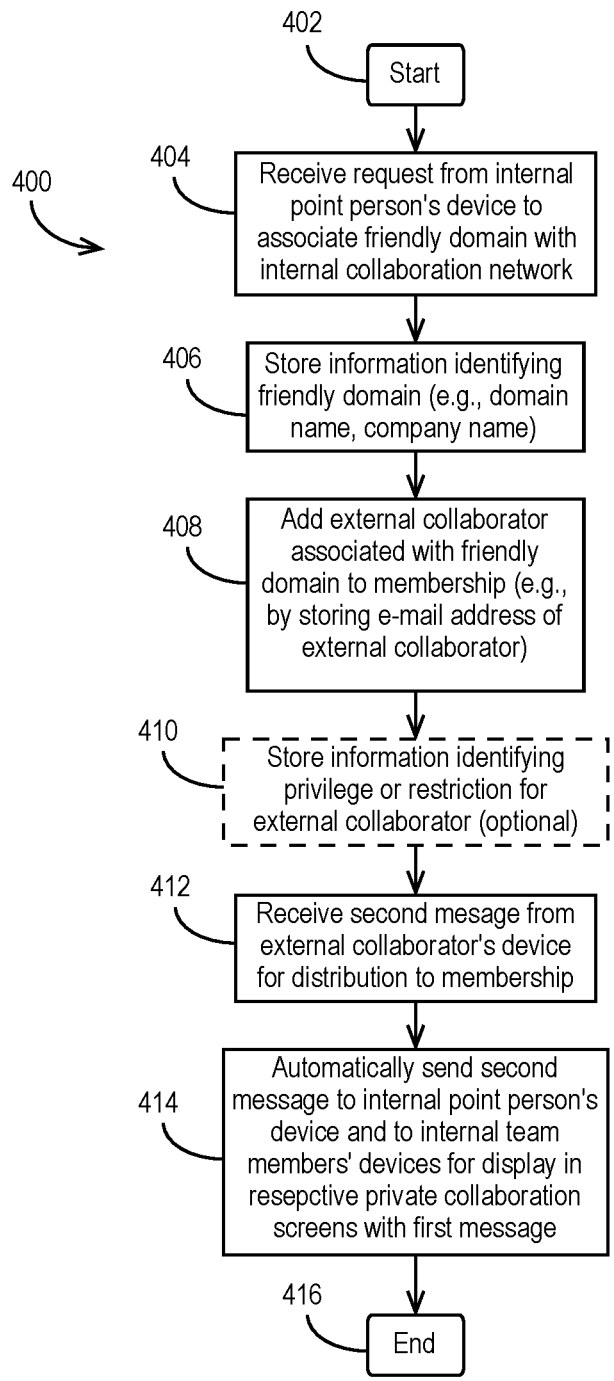
FIG. 12 illustrates a flowchart of one way in which an internal point person can identify a friendly domain and thereafter add external collaborators to an internal collaboration network in accordance with some embodiments.

As explained above, in some embodiments, the communication facilitation system 100 enables communications between team members within different companies (i.e., between people within the internal point person's organization and people within a partner organization or an affiliate). In some embodiments, the internal point person may instruct the communication facilitation system 100 to allow the inclusion of members who are not a part of the internal point person's company in the internal collaboration network. FIG. 12 illustrates a flowchart 400 of one way in which the internal point person can identify a friendly domain to the communication facilitation system 100 and thereafter add external collaborators to the internal collaboration network in accordance with some embodiments.

At 402, the process begins. At 404, the communication facilitation system 100 receives a request from the internal point person's computing device 105 to associate a friendly domain with the internal collaboration network. Using the example provided in FIG. 11B, the internal point person would request to associate the domain "partner.com" with the internal collaboration network.

At 406, the communication facilitation system 100 stores information identifying the friendly domain in memory 125. For example, the communication facilitation system 100 may store a domain name or a company name to identify the friendly domain. At 408, the communication facilitation system 100 adds an external collaborator associated with the friendly domain to the membership. Block 408 may be triggered by a request from the internal point person (sent from the internal point person's computing device 105), or it may occur if the e-mail 112 to or from the external contact (or the additional e-mail sent later by the external contact) includes the external collaborator in the recipient list (e.g., the "to" or "cc" field). At 410, the communication facilitation system 100 optionally stores information identifying a privilege applicable to the external collaborator added to the membership of the internal collaboration network in block 408.

At 412, the communication facilitation system 100 receives a message from the external collaborator's computing device 111 for distribution to the membership. In response, at 414 the communication facilitation system 100 automatically sends the message from the external collaborator's computing device 111 to the computing devices 105, 110 associated with the internal point person and the internal team members. The message from the external contact is then presented to the internal point person and the internal team members through the app's private collaboration view screens on their respective computing devices 105, 110 along with the rest of the communications within the internal communication network, including the first message sent by the internal point person. At 416, the process ends.

In many of the embodiments discussed above, it has been assumed that the request to use the internal collaboration network is received from the computing device 105, which is associated with the internal point person. Alternatively, the request to use the internal collaboration network may be received from a computing device associated with someone else (e.g., an internal team member). For example, if an e-mail includes others from the internal point person's company in the "to," "from," or "cc" list, any one of those people could initiate the request to use the internal collaboration network (whether preconfigured or established on the fly). Such embodiments are within the scope of the disclosure herein.

Figure 13:
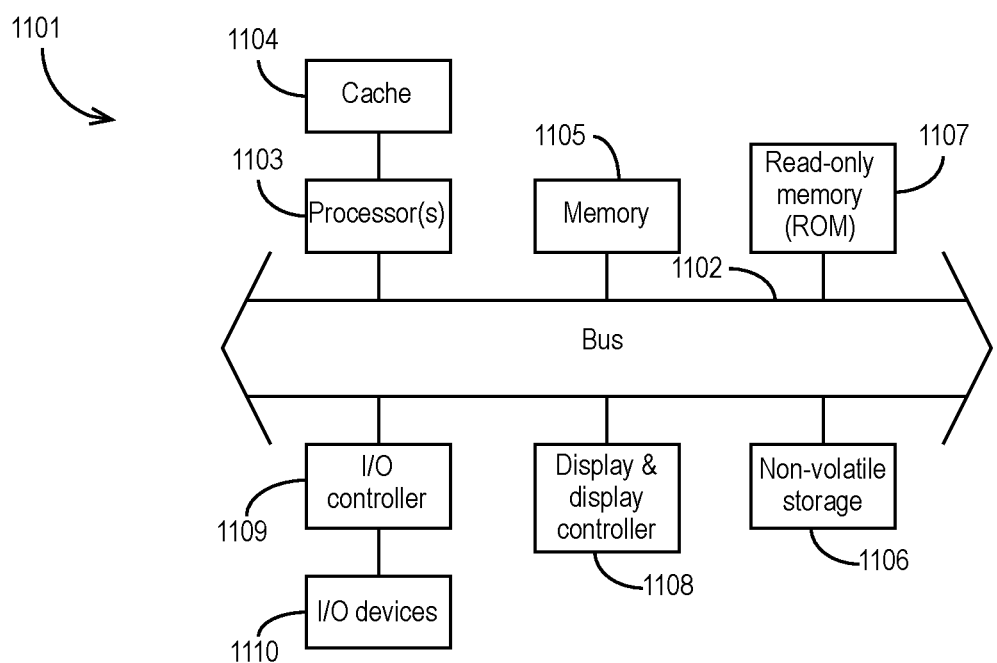
FIG. 13 illustrates one example of a computer system that may be used to implement disclosed systems and methods.

FIG. 13 shows one example of a computer system that may be used to implement the communication facilitation system 100. Note that although FIG. 13 illustrates various components of a computer system, it is not intended to represent any particular architecture or manner of interconnecting the components, as such details are not germane to the present disclosure. It should be noted that the architecture of FIG. 13 is provided for purposes of illustration only and that a computer system or other digital processing system used to implement the embodiments disclosed herein is not limited to this specific architecture. It will also be appreciated that network computers and other data processing systems that have fewer components or perhaps more components may also be used with the embodiments disclosed herein. The computer system of FIG. 13 may, for example, be a server or a desktop computer running any suitable operating system (e.g., Microsoft Windows, Mac OS, Linux, Unix, etc.).

As shown in FIG. 13, the computer system 1101, which is a form of a data processing system, includes a bus 1102 that is coupled to a microprocessor 1103 and a ROM 1107 and volatile RAM 1105 and a non-volatile memory 1106. The microprocessor 1103, which may be a microprocessor from Intel or Motorola, Inc. or IBM, is coupled to cache memory 1104. The bus 1102 interconnects these various components together and may also interconnect the components 1103, 1107, 1105, and 1106 to a display controller and display device 1108 and to peripheral devices such as input/output (I/O) devices, which may be mice, keyboards, modems, network interfaces, printers, scanners, displays (e.g., cathode ray tube (CRT) or liquid crystal display (LCD)), video cameras, and other devices that are well known in the art. Typically, the input/output devices 1110 are coupled to the system through input/output controllers 1109.

Output devices may include, for example, a visual output device, an audio output device, and/or tactile output device (e.g., vibrations, etc.). Input devices may include, for example, an alphanumeric input device, such as a keyboard including alphanumeric and other keys, for enabling a user to communicate information and command selections to the microprocessor 1103. Input devices may include, for example, a cursor control device, such as a mouse, a trackball, stylus, cursor direction keys, or touch screen, for communicating direction information and command selections to the microprocessor 1103, and for controlling movement on the display & display controller 1108.

The I/O devices 1110 may also include a network device for accessing other nodes of a distributed system via the communication network 116. The network device may include any of a number of commercially available networking peripheral devices such as those used for coupling to an Ethernet, token ring, Internet, or wide area network, personal area network, wireless network, or other method of accessing other devices. The network device may further be a null-modem connection, or any other mechanism that provides connectivity between the communication facilitation system 100 and the outside world.

The volatile RAM 1105 may implemented as dynamic RAM (DRAM), which requires power continually in order to refresh or maintain the data in the memory. The non-volatile memory 1106 may be a magnetic hard drive or a magnetic optical drive or an optical drive or a DVD RAM or other type of memory system that maintains data even after power is removed from the system. Typically, the nonvolatile memory will also be a random access memory, although this is not required. Although FIG. 13 shows that the non-volatile memory is a local device coupled directly to the rest of the components in the data processing system, it will be appreciated that the communication facilitation system 100 may utilize a non-volatile memory that is remote from the system, such as a network storage device that is coupled to the data processing system through a network interface such as a modem or Ethernet interface. The bus 1102 may include one or more buses connected to each other through various bridges, controllers and/or adapters as is well known in the art. The I/O controller 1109 may include a USB (Universal Serial Bus) adapter for controlling USB peripherals, and/or an IEEE 1394 bus adapter for controlling IEEE-1394 peripherals.

It will be apparent from this description that aspects of the communication facilitation system 100 may be embodied, at least in part, in software. That is, the techniques may be carried out in a computer system or other data processing system in response to its processor, such as a microprocessor, executing sequences of instructions contained in a memory, such as ROM 1107, volatile RAM 1105, non-volatile memory 1106, cache 1104 or a remote storage device. In various embodiments, hard-wired circuitry may be used in combination with software instructions to implement the communication facilitation system 100. Thus, the techniques are not limited to any specific combination of hardware circuitry and software, nor to any particular source for the instructions executed by the data processing system. In addition, various functions and operations may be performed by or caused by software code, and therefore the functions and operations result from execution of the code by a processor, such as the microprocessor 1103.

A non-transitory machine-readable medium can be used to store software and data (e.g., machine-executable instructions) that, when executed by a data processing system (e.g., at least one processor), causes the system to perform various methods disclosed herein. This executable software and data may be stored in various places including for example ROM 1107, volatile RAM 1105, non-volatile memory 1106 and/or cache 1104. Portions of this software and/or data may be stored in any one of these storage devices.

Thus, a machine-readable medium includes any mechanism that provides (i.e., stores and/or transmits) information in a form accessible by a machine (e.g., a computer, network device, mobile device, personal digital assistant, manufacturing tool, any device with a set of one or more processors, etc.). For example, a machine-readable medium includes recordable/non-recordable media (e.g., read only memory (ROM), random access memory (RAM), magnetic disk storage media, optical storage media, flash memory devices, etc.).

Note that any or all of the components of this system illustrated in FIG. 13 and associated hardware may be used in various embodiments. It will be appreciated by those of ordinary skill in the art that the particular machine that embodies the communication facilitation system 100 may be configured in various ways according to the particular implementation. The control logic or software implementing the disclosed embodiments can be stored in main memory, a mass storage device, or other storage medium locally or remotely accessible to processor 1103 (e.g., memory 125 illustrated in FIG. 2).

In the foregoing description and in the accompanying drawings, specific terminology has been set forth to provide a thorough understanding of the disclosed embodiments. In some instances, the terminology or drawings may imply specific details that are not required to practice the disclosed embodiments.

To avoid obscuring the present disclosure unnecessarily, well-known components (e.g., memory) are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used herein, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to." The terms "exemplary" and "embodiment" are used to express examples, not preferences or requirements.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A method of facilitating electronic communication between an external contact and an internal point person and between the internal point person and one or more internal team members, the method comprising:

identifying a membership for an internal collaboration network based on recipient information from a first e-mail received from or sent to the external contact, the membership including the internal point person and excluding the external contact;

storing, in memory, information identifying the membership and information identifying a subject of the first e-mail;

receiving, from a first computing device associated with the internal point person, a first message created by the internal point person, the first message for distribution to the membership;

based on the stored information identifying the membership, automatically sending the first message to a second computing device for display in a private collaboration view of an application on the second computing device, the second computing device being associated with one of the one or more internal team members, wherein the private collaboration view displays communications within the internal collaboration network;

receiving a second e-mail from the external contact, wherein a subject of the second e-mail matches the subject of the first e-mail; and based on a determination that the subject of the second e-mail matches the subject of the first e-mail, automatically sending, to a plurality of computing devices including the first computing device and the second computing device, information configured to cause each of the plurality of computing devices to display content from the second e-mail in a respective customer view along with content from the first e-mail.

2. The method of claim 1, wherein identifying the membership for the internal collaboration network based on the recipient information from the first e-mail received from or sent to the external contact comprises examining metadata associated with the first e-mail or examining a list of one or more recipients of the first e-mail.

3. The method of claim 1, wherein identifying the membership for the internal collaboration network based on the recipient information from the first e-mail received from or sent to the external contact comprises searching the first e-mail for a domain name identifying a specified entity.

4. The method of claim 3, wherein the specified entity is a company.

5. The method of claim 1, wherein receiving, from the first computing device, the first message from the internal point person comprises receiving a chat message.

6. The method of claim 1, wherein the message comprises a file.

7. The method of claim 1, wherein sending the first message to the second computing device comprises pushing the first message to the second computing device through a push notification service.

8. The method of claim 1, further comprising:
receiving, from the first computing device, information identifying the one or more internal team members;
updating, in memory, the membership based on the information identifying the one or more internal team members.

9. The method of claim 8, further comprising:
receiving, from the first computing device, information establishing a privilege granted to or a restriction imposed on the one or more internal team members.

10. The method of claim 1, further comprising:
storing, in memory, information identifying at least one privilege associated with the internal point person.

11. The method of claim 10, wherein the at least one privilege associated with the internal point person enables the internal point person to (a) communicate electronically with the external contact, (b) modify the membership, (c) grant or revoke one or more privileges of at least one of the one or more internal team members, or (d) any combination of these.

12. The method of claim 1, further comprising:
storing, in memory, information identifying at least one privilege granted to or at least one restriction imposed on at least one of the one or more internal team members.

13. The method of claim 12, wherein the at least one privilege granted to or the at least one restriction imposed on the at least one of the one or more internal team members is dependent on whether the at least one of the one or more internal team members is identified by the recipient information from the first e-mail received from or sent to the external contact.

14. The method of claim 1, further comprising:
receiving a file from the second computing device, the file for distribution to the membership; and
automatically sending, to the first computing device, information enabling the internal point person to access the file from the private collaboration view of the first computing device.

15. The method of claim 1, further comprising:
receiving a file from the first computing device, the file for distribution to the membership; and
automatically sending, to the second computing device, information enabling the one of the one or more internal team members to access the file from the private collaboration view of the second computing device.

16. The method of claim 1, further comprising:
receiving, from the first computing device, a request to associate a friendly domain with the internal collaboration network;
storing, in memory, information identifying the friendly domain; and
adding, to the membership, an external collaborator, wherein the external collaborator is associated with the friendly domain.

17. The method of claim 16, wherein adding, to the membership, the external collaborator comprises storing, in memory, an e-mail address of the external collaborator, wherein the e-mail address identifies the external collaborator as associated with the friendly domain.

18. The method of claim 16, further comprising:
storing, in memory, information identifying at least one privilege granted to or at least one restriction imposed on the external collaborator.

19. The method of claim 16, further comprising:
receiving, from a third computing device associated with the external collaborator, a second message for distribution to the membership; and
automatically sending, to the plurality of computing devices, information configured to cause each of the plurality of computing devices to display the second message in its private collaboration view along with the first message.

20. A non-transitory computer-readable medium storing one or more machine executable instructions that, when executed by one or more processors, cause the one or more processors to execute the method of claim 1.

* * * * *